US008781725B2

(12) United States Patent
Bucchieri

(10) Patent No.: US 8,781,725 B2
(45) Date of Patent: Jul. 15, 2014

(54) METHODS AND APPARATUS FOR CAPABILITY-SPECIFIC ROUTING

(75) Inventor: Vittorio Bucchieri, Wakefield, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1866 days.

(21) Appl. No.: 11/614,363

(22) Filed: Dec. 21, 2006

(65) Prior Publication Data

US 2008/0154496 A1  Jun. 26, 2008

(51) Int. Cl.
*G01C 21/26* (2006.01)
*G09B 29/10* (2006.01)

(52) U.S. Cl.
USPC ............................ 701/410; 701/439; 701/454

(58) Field of Classification Search
CPC ......... H04W 8/18; H04L 67/24; H04L 67/12; H04L 67/22; H04L 67/30; H04L 43/04; H04L 67/306; G06F 17/30; G06F 17/3087; G06F 17/30041; A63B 2225/50; A63B 2220/12; A63B 2220/14; A63B 24/0021
See application file for complete search history.

(56) References Cited

U.S. PATENT DOCUMENTS

| | | | | |
|---|---|---|---|---|
| 5,470,233 A | * | 11/1995 | Fruchterman et al. | 434/112 |
| 6,502,032 B1 | * | 12/2002 | Newman | 701/487 |
| 6,842,692 B2 | * | 1/2005 | Fehr et al. | 701/23 |
| 7,149,626 B1 | * | 12/2006 | Devries et al. | 701/211 |
| 7,336,226 B2 | * | 2/2008 | Jung et al. | 342/357.52 |
| 7,366,499 B1 | * | 4/2008 | Michaelis | 455/413 |
| 7,460,953 B2 | * | 12/2008 | Herbst et al. | 701/211 |
| 7,620,493 B2 | * | 11/2009 | Stankiewicz et al. | 701/207 |
| 2002/0063632 A1 | * | 5/2002 | Bowman et al. | 340/825.19 |
| 2002/0128767 A1 | * | 9/2002 | Cardno et al. | 701/202 |
| 2005/0080902 A1 | * | 4/2005 | Parupudi et al. | 709/226 |
| 2005/0149254 A1 | * | 7/2005 | Yamada et al. | 701/202 |
| 2006/0136393 A1 | * | 6/2006 | Abbott et al. | 707/3 |
| 2006/0146719 A1 | * | 7/2006 | Sobek et al. | 370/238 |
| 2006/0229807 A1 | * | 10/2006 | Sheha et al. | 701/209 |
| 2006/0284765 A1 | * | 12/2006 | Bernhardt et al. | 342/357.09 |
| 2006/0293839 A1 | * | 12/2006 | Stankiewcz et al. | 701/200 |
| 2007/0106468 A1 | * | 5/2007 | Eichenbaum et al. | 701/211 |
| 2007/0168208 A1 | * | 7/2007 | Aikas et al. | 705/1 |
| 2008/0046298 A1 | * | 2/2008 | Ben-Yehuda et al. | 705/6 |

* cited by examiner

*Primary Examiner* — Ryan Zeender
*Assistant Examiner* — Dana Amsdell

(57) ABSTRACT

A method is provided for performing capability-specific routing. The method includes receiving location information specifying a location. At least one capability indicator representative of user capabilities is also received. A database is accessed, the database specifying, based on user capabilities, facilities that can be accessed by a user, as well as respective geographic locations of specified facilities. A determination is then made as to the facilities that are associated with the received location that are compatible with the received capability indicator. Position information specifying a position may also be received, and at least one route may be determined between the location and the position, the route being compatible with the capability indicator. An apparatus and a computer program product are also provided.

25 Claims, 4 Drawing Sheets

| Location | Facility | Character | Rec. for 65+ | Rec. for Blind | Rec. for Wheel-chair travel | Bus Connection |
|---|---|---|---|---|---|---|
| First St. Between Main St. and Willow Rd. | Paved walk | 15 ° incline | N | Y | N | Y |
| First St. & Main St. | Full curb | Audible inter-section signals | Y | Y | Y | N |
| | | | | | | |
| 101 Main St. | Building | Entrance ramp | Y | Y | Y | N |

Fig. 2

METHODS AND APPARATUS FOR CAPABILITY-SPECIFIC ROUTING

BACKGROUND INFORMATION

Since the enactment of the Americans with Disabilities Act (ADA), many newly constructed buildings and facilities are designed to be accessible to those with special needs, including, for example, those in wheelchairs and the blind. Examples of design features targeting those with special needs include the inclusion of curb cuts, the use of audible signals at intersections utilizing traffic lights, and the use of ramps at raised or lowered building entrances. However, despite these advances, there remain a significant number of streets, buildings, and businesses that are not prepared to accommodate persons with such special needs. This is especially true in areas in which significant construction occurred earlier than the enactment of the ADA. Consequently, it is often difficult for those with special needs to be able to determine which facilities in a given area may be compatible with a specific set of needs or capabilities. This problem is particularly acute when those with special needs travel to unfamiliar areas and need to determine routes that are compatible with a specific set of needs or capabilities.

BRIEF DESCRIPTION OF THE SEVERAL VIEWS OF THE DRAWING(S)

FIG. 2 shows a database configured for utilization in the system of FIG. 1.

DETAILED DESCRIPTION

Exemplary embodiments now will be described more fully hereinafter with reference to the accompanying drawings, in which exemplary embodiments and examples are shown. Like numbers refer to like elements throughout.

Figure 1:
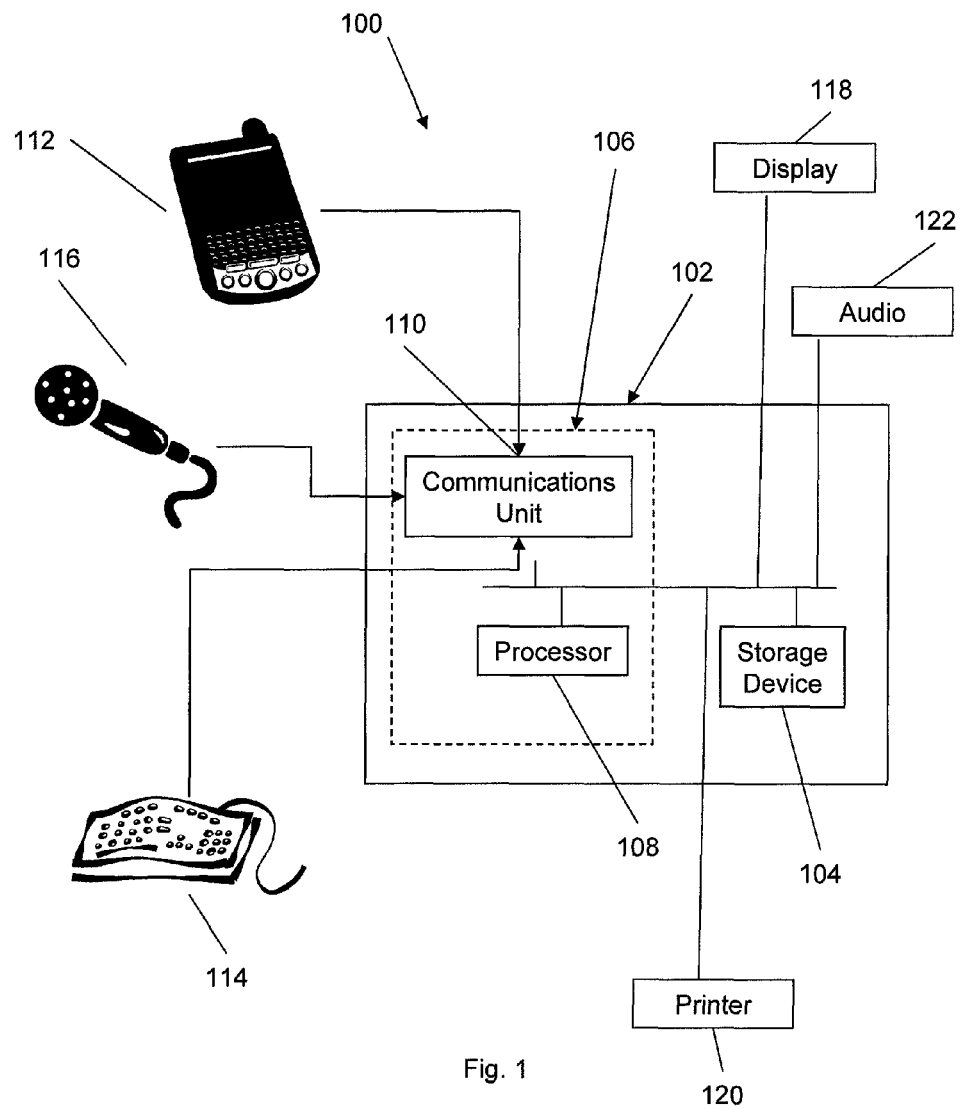
FIG. 1 is a block diagram of a system for determining a capability-specific route, the system constructed in accordance with an exemplary embodiment.

Referring to FIG. 1, therein is shown a system for providing accessibility information, the system being configured in accordance with an exemplary embodiment. System 100 includes a mapping apparatus 102 that has a storage unit, such as memory 104, and a processing unit 106. Processing unit 106 may include a processor 108 and/or a communications unit 110. The communications unit 110 is configured to allow apparatus 102 to interact with and receive information from one or more of a mobile data device such as cellular telephone 112, a user interface such as keyboard 114, and/or a microphone 116, possibly coupled to a voice-to-data converter. Along these lines, communications unit 110 may include a network connection, such as a wireless network connection, or one or more input ports for a data device.

Referring to FIGS. 1 and 2, memory 104 may contain a database 230 specifying, based on user capabilities, facilities that can be accessed by a user and respective geographic locations thereof. As an example, database 230 may contain a listing of geographic locations, such as those listed in fields 232a, 234a, etc. Geographic locations may refer to spatial locations, or may refer to structures and/or infrastructure located at spatial locations. For example, geographic locations may include, portions of streets and/or city blocks, intersections, street addresses, public and/or private buildings.

Each location may be associated with one or more facilities (such as those facilities identified in fields 232b, 234b, etc.), with one or more accessibility-related characteristics for each facility being identified (e.g., as in fields 232c, 234c, etc.). Specifically, as shown, a location may refer to a city block or a portion of a road, such as "First Street between Main Street and Willow Road" listed in field 232a. Associated facilities might then be a sidewalk on one side of the street, a shoulder area on an opposing side of the street, and a bus stop located on the block. For the sidewalk, characteristics that might be identified include the time since the sidewalk was last paved and the grade of the sidewalk (or street). For the shoulder area, characteristics that might be identified include the composition of the shoulder (e.g., paved, gravel, etc.) and the width of the shoulder. For the bus stop, characteristics that might be listed in database 230 include information regarding bus loading facilities (e.g., need to go over a curb, entrance ramp, etc.) and the facilities present on the bus for accommodating, say, a passenger in a wheelchair.

In cases where the geographic location is, for example, a public building, accessibility characteristics may be stored in database 230 and associated with the building in much the same way as discussed above for the case in which the geographic location is a portion of a road. Relevant information may include the number of floors in the building, the various options for moving between floors (e.g., elevators, stairs, ramps), options for entering the building, and any lavatory accommodations for those with special needs. For geographic locations that are intersections, relevant characteristics may include the presence of a traffic light, the inclusion of audible commands indicating traffic status, and the presence of a curb cut for entering and exiting the street.

Each location/facility may also be associated with one or more subjective characteristics. For example, an indication may be provided as to whether the facility is recommended for persons in wheelchairs or whether the facility is recommended for persons of age greater than 55, 60, 65, etc. As another example, facilities can be rated as "highly accessible," "moderately accessible," "strenuous," etc.

In one embodiment, processing unit 106 may be configured to receive at least one capability indicator representative of user capabilities. Possible capability indicators may include indication of characteristics such as, for example, frailty, weakness, deafness, blindness, guide dog use, wheelchair use, walker use, crutch use, cane use, reduced motor capacity, and/or reduced mental capacity. These indicators can be set within apparatus 102, for example, stored in memory 104, or can be input via one of the input devices 112, 114, 116.

Processing unit 106 may also be configured to receive information specifying a location, possibly via one of the input devices 112, 114, 116. Based on this location information and one or more of the capability indicators, processing unit 106 may search database 230 and determine facilities associated with the location that are compatible and/or incompatible with the capability indicator. For example, a user may specify a location (such as a residence of the user) and an indication of capability, such as the fact that the user is a wheelchair user. Processing unit 106 might then return a list of all of the facilities in the area around the specified location that are configured to be accessible to those in wheelchairs. In some embodiments, a user may also specify a specific type of facility in which the user is interested. For example, a user may specify that he/she uses a wheelchair and is looking for a grocery store or a library, and the processing unit 106 could consequently determine which grocery stores or libraries in an area around the specified location are prepared to accommodate wheelchair-bound patrons.

In another embodiment, database 130 may specify, based on user capabilities, pedestrian facilities and transportation services that can be accessed by a user. For example, database 230 may identify streets having/lacking sidewalks, locations of significant hills or steep grades, and intersections including audible commands and curb cuts, as well as identifying significant, if not complete, schedule information for buses and van services, trains, and subways.

Processing unit 106 may be configured to receive, in addition to the location information, position information specifying a position unique from the location. For example, the location may be an origin, and the position may be a destination, both of which, for example, may be input using one of the input devices 112, 114, 116. Processing unit 106 may then determine a route between the origin and the destination that is compatible with the capability indicator. That is, processing unit 106 may specify a series of adjacent and/or related geographic locations that have accessibility characteristics consistent with the capabilities of the traveler at issue. One example would be, for a user/traveler in a wheelchair, specifying a route starting at the origin, terminating at the destination, and composed of a continuous series of sidewalks and intersections including curb cuts. The determined route may include personal transport, possibly over pedestrian pathways, transportation services, or a combination thereof. For example, a route specified for a wheelchair traveler could include a continuous series of sidewalks leading from an origin to a bus stop for a wheelchair accessible bus, and from a different bus stop of the wheelchair accessible bus to the destination via another continuous series of sidewalks.

In order to facilitate routing by the processing unit 106, each geographic location may be associated with a point or curve defined in a coordinate system matched to the surface of the earth, such as a coordinate system consisting of latitudes and longitudes. Providing such a coordinate system may allow for linking various geographic locations in space, determining spatial relationships, continuity of paths, and other associated vector quantities.

In some cases, processing unit 106 may be configured to determine multiple routes between an origin and a destination, each route being compatible with a specified capability indicator. This may be useful, for example, in cases where factors not amenable to automatic determination, such as a personal preference regarding the sights available along a route, may affect which route would be most desirable. This scheme may also be useful in cases where different routes offer different advantages. For example, a route including bus transport may be less strenuous for a traveler, but may involve a monetary charge for the traveler, while a route composed completely of personal transport may involve more traveler exertion but without monetary cost. In such cases, processing unit 106 may leave the ultimate determination of route to a user. In other cases, processing unit 106 may choose, either based on user inputs or pre-defined route criteria, a preferred route from amongst the multiple possible routes. Possible route criteria might include, for example, minimization of route distance, minimization of personal transport involvement (or maximum utilization of transportation services such as public buses), and/or minimization of the time required to complete the route. Apparatus 102 may also communicate with one or more output devices, such as a display device 118, a printer 120 capable of printing raised features including Braille, and/or an audio output device for converting data to audible outputs 122. An apparatus according to Claim 2a, further comprising an output device configured to provide at least one output selected from the group consisting of: a graphical map of the route, a Braille map of the route, textual directions representative of the route, and an audible signal including directions representative of the route.

Figure 3A:
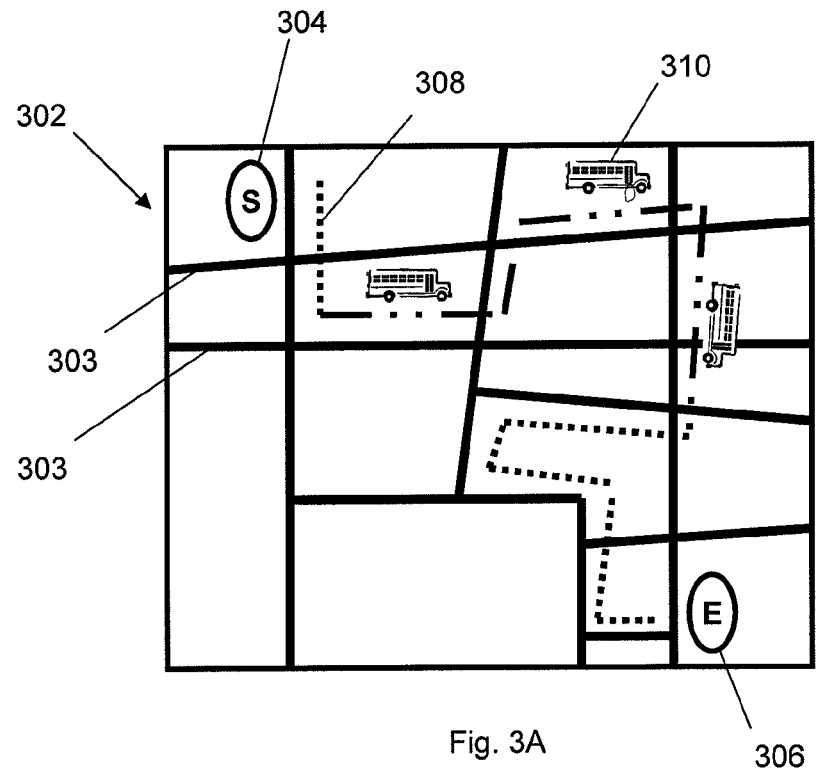
FIGS. 3a and 3b are schematic views of outputs from the system of FIG. 1.
Figure 3B:
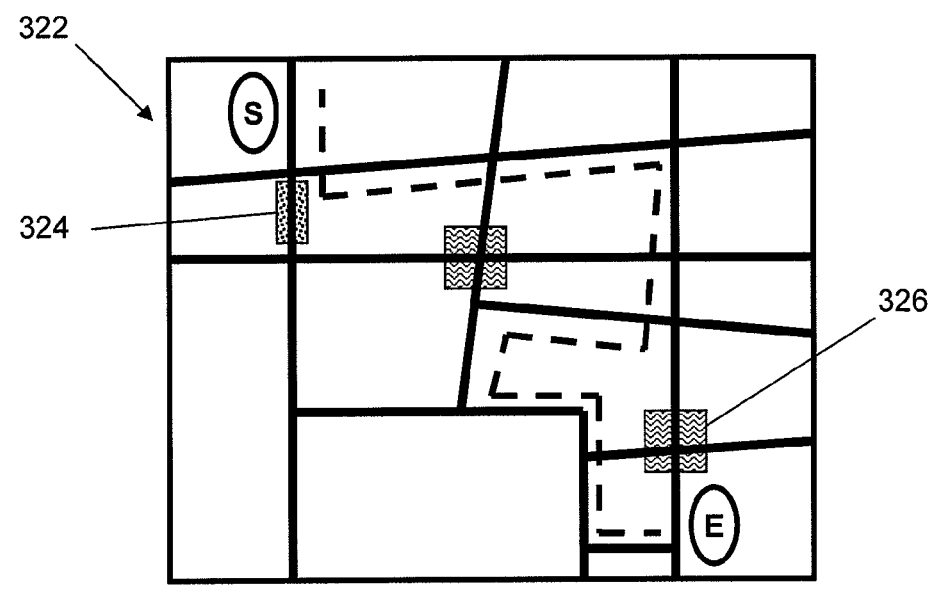

Referring to FIGS. 3*a* and 3*b*, therein are shown views of possible outputs that may be obtained from apparatus 102 and the associated output devices 118, 120, 122. For example, a plot 302 may show the streets (e.g., 303) in an area around start and end locations, and may specify personal transport (i.e., walking, wheelchair, etc.) and/or bus routes between the start and end. Start and end locations may be specified by icons 304 and 306, respectively, on plot 302. The type of transportation intended for each segment of the route might be indicated by various markers or icons (e.g., dotted line 308 to indicate personal transport and a bus 310 to indicate mechanized transport). Alternatively, a plot 322 may show area around a starting and an ending location, and may show a preferred route between the two (based on predetermined criteria or on user specified criteria), as well as identifying potential difficulties/hazards in the area about the starting and ending locations and/or the route therebetween. For example, plot 322 might indicate streets lacking a paved sidewalk (see icon 324) or intersections lacking curb cuts (see icon 326). Such display features might be helpful in cases where a traveler is forced to depart from an intended course, thereby allowing the traveler to choose an appropriate alternative path. While the outputs are shown in graphical form, similar information can be represented in textual information (possibly in Braille) or via audible data transfer.

Figure 4:
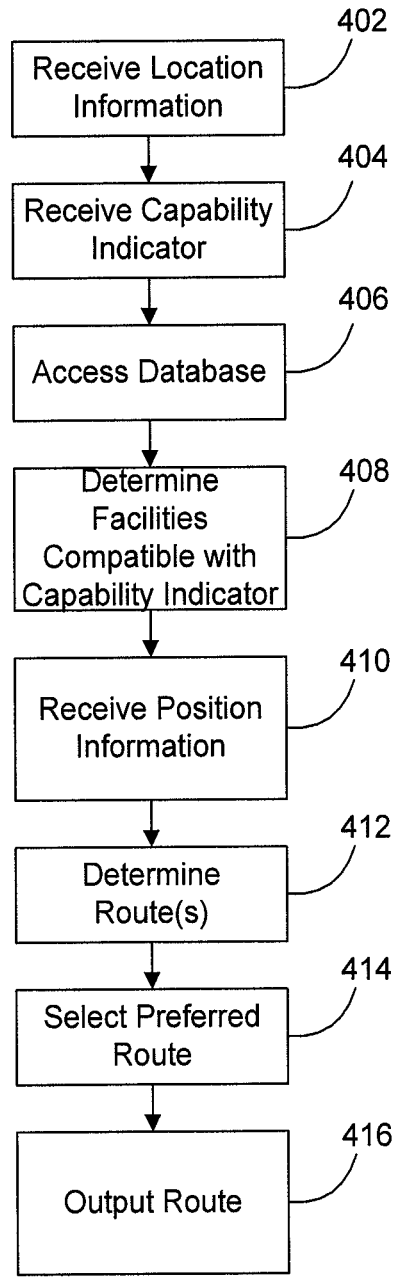
FIG. 4 is a flowchart indicating an exemplary method for determining a capability-specific route in accordance with exemplary embodiments.

Referring to FIGS. 1, 2, and 4, an example of the possible operation of one embodiment will now be described. At Block 402, location information is received (e.g., at communications unit 110 via one of the user input devices 112-116), the location information specifying a location. At Block 404, at least one capability indicator is received (possibly via the same channels as the location information), the capability indicator being representative of the capabilities of a user. Possible capability indicators include, but are not limited to, specification of frailty, weakness, deafness, blindness, guide dog use, wheelchair use, walker use, crutch use, cane use, and/or mental capacity.

A database (e.g., in storage device 104) is accessed (e.g., by processor 108) at Block 406 that specifies facilities that can be accessed as a function of user capabilities. The database may specify, based on user capabilities, sidewalks that can be accessed by a user, intersections that can be accessed by a user, walkways that can be accessed by a user, roadways that can be accessed by a user, transportation services that can be accessed by a user, and/or public buildings that can be accessed by a user. The database may also specify geographic locations of each of the specified facilities. At Block 408, a determination is made as to the subset of facilities specified in the database that are both associated with the received location (e.g., within a specified radius of the location) and compatible with the received capability indicator. In some embodiments, facilities may be first sorted by geographic location, such that only those facilities within some specified/predetermined area about a location/route will be examined for compatibility.

In some embodiments, at Block 410, position information specifying a position is also received, and at Block 412, one or more routes between the location and the position are determined, each route being compatible with the capability indicator. As mentioned earlier, the database may specify, based on user capabilities, pedestrian facilities and transportation services that can be accessed by a user, and determined routes may involve a combination of personal and mechanized transport provided by a transportation service. At Block 414, a preferred route is selected for traveling between the location and the position, based on at least one route criterion. Possible route criteria include, amongst others, minimization of route distance, minimization of personal transport involvement, and minimization of a time required for route travel. The route criteria can either be received on a case-by-case basis or can be pre-determined. At Block 416, one or more outputs are provided for indicating the preferred route. Such output may be, for example, a graphical map of the route, a Braille map of the route, textual directions representative of the route, and an audible signal including directions representative of the route.

It is understood that at least some of the operations described in conjunction with FIG. 4 may be performed through hardware, software, or combinations thereof. Therefore, embodiments may take the form of hardware systems and/or apparatuses, software, or combinations thereof. As an example, embodiments may include a computer program product that includes a computer-readable storage medium (e.g., memory) and one or more executable portions (e.g., software) stored by the computer-readable storage medium for performing the operations described herein upon execution thereof. For example, the executable portions may be stored in memory of mapping apparatus 102 and/or processing unit 106 such that the respective processors or other computing devices of one or both of mapping apparatus 102 and processing unit 106 may access and execute the executable portions of the computer program product in order to perform the functions described herein including, for example, those depicted in FIG. 4.

In the preceding specification, various embodiments of the claimed invention have been described. It will, however, be evident that various modifications and changes may be made thereunto without departing from the broader spirit and scope of the invention as set forth in the claims that follow. The specification and drawings are accordingly to be regarded in an illustrative rather than restrictive sense.

That which is claimed:

1. A computer implemented method comprising:
    storing, by at least one processor, data that includes:
        information relating to a plurality of geographic locations,
        information relating to a plurality of facilities,
        a plurality of accessibility-related characteristics, and
        a plurality of subjective characteristics that include information regarding access to each of the plurality of geographic locations,
            each of the plurality of subjective characteristics relating to an accessibility-related characteristic of the plurality of accessibility-related characteristics;
    receiving, by the at least one processor, location information specifying a geographic location,
        the specified geographic location corresponding to one of the plurality of geographic locations;
    receiving, by the at least one processor, at least one capability indicator representative of user capabilities of a user;
    accessing, by the at least one processor, the data;
    determining, by the at least one processor, one or more facilities, associated with the geographic location, that are compatible with the user capabilities based on comparing the at least one capability indicator to the information relating to the plurality of geographic locations, the information relating to the plurality of facilities, the plurality of accessibility-related characteristics, and the plurality of subjective characteristics;
    receiving, by the at least one processor, information relating to a plurality of routes for accessing the specified geographic location;
    selecting, by the at least one processor and based on the comparison, a route, of the plurality of routes, that is compatible with the user capabilities by prioritizing the route over each other route, of the plurality of routes, based on the route including a minimum number of obstacles associated with the user capabilities; and
    providing, by the at least one processor and to the user, information relating to the selected route.

2. The method according to claim 1, further comprising:
    receiving position information specifying a position of the user; and
    determining, based on the position information, the plurality of routes.

3. The method according to claim 2, where
    when accessing the data, the method includes:
        accessing data associated with one or more pedestrian facilities and one or more transportation services that can be accessed by the user, and
    when determining the plurality of routes, the method includes:
        determining the plurality of routes by incorporating at least one of personal transport or the one or more transportation services.

4. The method according to claim 1, where, when selecting the route, the method includes:
    selecting the route based on at least one route criterion.

5. The method according to claim 1, where the selected route is based on at least one of:
    a minimization of route distance,
    a minimization of personal transport involvement, or
    a minimization of a time required for travel.

6. The method according to claim 4, further comprising:
    receiving the at least one route criterion.

7. The method according to claim 1, where, when providing the information relating to the selected route, the method includes:
    providing the information relating to the selected route using at least one of:
        a graphical map of the route,
        a Braille map of the route,
        one or more textual directions representative of the route, or
        an audible signal including one or more directions representative of the route.

8. The method according to claim 1, where the at least one capability indicator indicates at least one of:
    frailty,
    weakness,
    deafness,
    blindness,
    guide dog use,
    wheelchair use,
    walker use,
    crutch use,
    cane use, or
    mental capacity.

9. The method according to claim 1, where the data includes information regarding at least one of:
    one or more sidewalks that can be accessed by the user,
    one or more intersections that can be accessed by the user,
    one or more walkways that can be accessed by the user,
    one or more roadways that can be accessed by the user, one or more transportation services that can be accessed by the user, or one or more public buildings that can be accessed by the user.

10. The method according to claim 1, where, when determining the one or more facilities, the method includes:
   determining one or more facilities within a specified radius of the geographic location.

11. An apparatus comprising:
   a memory that includes data, the data including:
      information relating to a plurality of geographic locations,
      information relating to a plurality of facilities,
      a plurality of accessibility-related characteristics, and
      a plurality of subjective characteristics that include information regarding access to each of the plurality of geographic locations,
         each of the plurality of subjective characteristics relating to an accessibility-related characteristic of the plurality of accessibility-related characteristics; and
   a processor to:
      receive information specifying a geographic location, the specified geographic location corresponding to one of the plurality of geographic locations;
      receive at least one capability indicator representative of one or more user capabilities of a user;
      determine, by accessing the data, one or more facilities, associated with the geographic location, that are compatible with the one or more user capabilities based on comparing the at least one capability indicator to the information relating to the plurality of geographic locations, the information relating to the plurality of facilities, the plurality of accessibility-related characteristics, and the plurality of subjective characteristics;
      receive information relating to a plurality of routes for accessing the specified geographic location;
      select, based on the comparison, a route, of the plurality of routes, that is compatible with the user capabilities by prioritizing the route over each other route, of the plurality of routes, based on the route including a minimum number of obstacles associated with the user capabilities; and
      provide, to the user, information relating to the selected route.

12. The apparatus according to claim 11, where the processor is further to:
   receive position information specifying a position of the user, and
   determine, based on the position information, the plurality of routes.

13. The apparatus according to claim 12, where
   the processor, when accessing the data, is further to:
      access data associated with one or more pedestrian facilities and one or more transportation services that can be accessed by the user; and
   the processor, when determining the plurality of routes, is further to:
      determine the plurality of routes by incorporating at least one of personal transport or the one or more transportation services.

14. The apparatus according to claim 11, where the processor, when selecting the route, is further to:
   select the route based on at least one route criterion.

15. The apparatus according to claim 11, where the processor, when providing the information relating to the selected route, is further to:
   provide the information relating to the selected route using at least one of:
   a graphical map of the route,
   a Braille map of the route,
   one or more textual directions representative of the route, or
   an audible signal including one or more directions representative of the route.

16. A non-transitory computer-readable medium storing instructions, the instructions comprising:
   one or more instructions which, when executed by at least one processor, cause the at least one processor to:
      store data that includes:
         information relating to a plurality of geographic locations,
         information relating to a plurality of facilities,
         a plurality of accessibility-related characteristics, and
         a plurality of subjective characteristics that include information regarding access to each of the plurality of geographic locations,
            each of the plurality of subjective characteristics relating to an accessibility-related characteristic of the plurality of accessibility-related characteristics;
      receive location information specifying a geographic location,
         the specified geographic location corresponding to one of the plurality of geographic locations;
      receive at least one capability indicator representative of user capabilities of a user;
      access the data;
      determine one or more facilities, associated with the geographic location, that are compatible with the user capabilities based on comparing the at least one capability indicator to the information relating to the plurality of geographic locations, the information relating to the plurality of facilities, the plurality of accessibility-related characteristics, and the plurality of subjective characteristics;
      receive information relating to a plurality of routes for accessing the specified geographic location;
      select, based on the comparison, a route, of the plurality of routes, that is compatible with the user capabilities by prioritizing the route over each other route, of the plurality of routes, based on the route including a minimum number of obstacles associated with the user capabilities; and
      provide, to the user, information relating to the selected route.

17. The computer-readable medium according to claim 16, where the instructions further comprise:
   one or more instructions to receive position information specifying a position of the user; and
   one or more instructions to determine, based on the position information, the plurality of routes.

18. The computer-readable medium according to claim 17, where
   the one or more instructions to access the data include:
      one or more instructions to access data associated with one or more pedestrian facilities and one or more transportation services that can be accessed by the user; and
   the one or more instructions to determine the plurality of routes include:

one or more instructions to determine the plurality of routes by incorporating at least one of personal transport or the one or more transportation services.

19. The computer-readable medium according to claim 16, where the one or more instructions to select the route include:
    one or more instructions to select the route based on at least one route criterion.

20. The computer-readable medium according to claim 16, where the selected route is based on at least one of:
    a minimization of route distance,
    a minimization of personal transport involvement, or
    a minimization of a time required for travel.

21. The computer-readable medium according to claim 19, where the instructions further comprise:
    one or more instructions to receive the at least one route criterion.

22. The computer-readable medium according to claim 16, where the one or more instructions to provide the information relating to the selected route include:
    one or more instructions to provide the information relating to the selected route using at least one of:
        a graphical map of the route,
        a Braille map of the route,
        one or more textual directions representative of the route, or
        an audible signal including one or more directions representative of the route.

23. The computer-readable medium according to claim 16, where the at least one capability indicator indicates at least one of:
    frailty,
    weakness,
    deafness,
    blindness,
    guide dog use,
    wheelchair use,
    walker use,
    crutch use,
    cane use, or
    mental capacity.

24. The computer-readable medium according to claim 16, where the data includes information regarding at least one of:
    one or more sidewalks that can be accessed by the user,
    one or more intersections that can be accessed by the user,
    one or more walkways that can be accessed by the user,
    one or more roadways that can be accessed by the user,
    one or more transportation services that can be accessed by the user, or
    one or more public buildings that can be accessed by the user.

25. The computer-readable medium according to claim 16, where the one or more instructions to determine the one or more facilities include:
    one or more instructions to determine one or more facilities within a specified radius of the geographic location.

* * * * *